(12) United States Patent
Yu et al.

(10) Patent No.: US 7,731,794 B2
(45) Date of Patent: Jun. 8, 2010

(54) HIGH STARCH LIGHT WEIGHT GYPSUM WALLBOARD

(75) Inventors: Qiang Yu, Grayslake, IL (US); Weixin D. Song, Lake Forest, IL (US); Michael R. Lynn, Arlington Heights, IL (US)

(73) Assignee: United States Gypsum Company, Chicago, IL (US)

( * ) Notice: Subject to any disclaimer, the term of this patent is extended or adjusted under 35 U.S.C. 154(b) by 957 days.

(21) Appl. No.: 11/449,177

(22) Filed: Jun. 7, 2006

(65) Prior Publication Data

US 2006/0278133 A1 Dec. 14, 2006

Related U.S. Application Data

(60) Provisional application No. 60/688,839, filed on Jun. 9, 2005.

(51) Int. Cl.
*C04B 11/00* (2006.01)

(52) U.S. Cl. .................. 106/772; 106/778; 428/400; 52/443; 156/39

(58) Field of Classification Search .............. 106/772, 106/778; 52/443; 428/400; 156/39
See application file for complete search history.

(56) References Cited

U.S. PATENT DOCUMENTS

| | | | |
|---|---|---|---|
| 1,702,729 A | 2/1929 | Hite | |
| 3,573,947 A | 4/1971 | Kinkade | |
| 4,184,887 A | 1/1980 | Lange et al. | |
| 4,237,260 A | 12/1980 | Lange et al. | |
| 4,392,896 A | 7/1983 | Sakakibara | |
| 5,575,844 A | 11/1996 | Bradshaw | |
| 6,340,388 B1 | 1/2002 | Luongo | |
| 6,342,284 B1 | 1/2002 | Yu et al. | |
| 6,387,172 B1 * | 5/2002 | Yu et al. | 106/680 |
| 6,398,864 B1 * | 6/2002 | Przybysz et al. | 106/772 |
| 6,406,537 B1 * | 6/2002 | Immordino | 106/778 |
| 6,409,819 B1 * | 6/2002 | Ko | 106/707 |
| 6,409,825 B1 | 6/2002 | Yu et al. | |
| 6,481,171 B2 * | 11/2002 | Yu et al. | 52/443 |
| 6,572,698 B1 * | 6/2003 | Ko | 106/772 |
| 6,632,550 B1 | 10/2003 | Yu et al. | |
| 6,774,146 B2 * | 8/2004 | Savoly et al. | 516/66 |
| 6,783,587 B2 | 8/2004 | Sethuraman et al. | |
| 6,800,131 B2 | 10/2004 | Yu et al. | |
| 6,832,652 B1 * | 12/2004 | Dillenbeck et al. | 166/293 |
| 7,425,236 B2 * | 9/2008 | Yu et al. | 106/772 |
| 7,455,728 B2 * | 11/2008 | Losch et al. | 106/778 |
| 2003/0084980 A1 | 5/2003 | Seufert et al. | |
| 2004/0026002 A1 | 2/2004 | Weldon et al. | |
| 2004/0092625 A1 | 5/2004 | Pollock et al. | |
| 2004/0231916 A1 | 11/2004 | Englert et al. | |
| 2005/0223949 A1 | 10/2005 | Bailey, Jr. et al. | |

FOREIGN PATENT DOCUMENTS

WO WO 01/45932 A1 6/2001

OTHER PUBLICATIONS

EP 1008568 (Jun. 14, 2000) Reisch et al. abstract only.*
CN 1396138 (Feb. 12, 2003) Li et al. abstract only.*
AT 406048 (Jan. 25, 2000) Cement Intellectual Property Ltd Bermuda abstract only.*
CN 1238312 (Dec. 15, 1999) Cao abstract only.*
EP 335405 (Oct. 4, 1989) Contento et al. abstract only.*
FR 2673620 (Sep. 11, 1992) Boussouria et al. abstract only.*
DE 4316518 (Nov. 24, 1994) Riemann et al. abstract only.*
NO 126524 (Feb. 19, 1973) Pran abstract only.*
"Standard Test Methods for Physical Testing of Gypsum Panel Products", *Annual Book of ASTM Standards*, Designations: C 473-97, vol. 04.01 1998, pp. 253-264.
*Diloflo® GW Products Bulletin*, "Polynaphthalene Sulfonate, Sodium Salt", GEO Specialty Chemicals, Horsham, PA (Nov. 1999).

* cited by examiner

*Primary Examiner*—Paul Marcantoni
(74) *Attorney, Agent, or Firm*—Drinker Biddle & Reath LLP

(57) ABSTRACT

The invention generally provides gypsum-containing slurries including stucco, naphthalenesulfonate dispersant, and pregelatinized starch. The naphthalenesulfonate dispersant is present in an amount of about 0.1%-3.0% by weight based on the weight of dry stucco. The pregelatinized starch is present in an amount of at least about 0.5% by weight up to about 10% by weight of pregelatinized starch by weight based on the weight of dry stucco in the formulation. Other slurry additives can include trimetaphosphate salts, accelerators, binders, paper fiber, glass fiber, and other known ingredients. The invention also comprises the gypsum-containing products made with such slurries, for example, gypsum wallboard, and a method of making gypsum wallboard.

15 Claims, No Drawings

HIGH STARCH LIGHT WEIGHT GYPSUM WALLBOARD

This application claims the benefit of U.S. Provisional Application No. 60/688,839, filed Jun. 9, 2005, the entire disclosure of which is hereby incorporated by reference herein.

FIELD OF THE INVENTION

This invention pertains to a method making gypsum slurries containing a pregelatinized starch and a naphthalenesulfonate dispersant, and products made therefrom. It also pertains to a method of increasing dry strength of gypsum-containing products including wallboard by using a naphthalenesulfonate dispersant in combination with pregelatinized starch in the slurry used to make the products.

BACKGROUND OF THE INVENTION

Certain properties of gypsum (calcium sulfate dihydrate) make it very popular for use in making industrial and building products, such as gypsum wallboard. Gypsum is a plentiful and generally inexpensive raw material which, through a process of dehydration and rehydration, can be cast, molded or otherwise formed into useful shapes. The base material from which gypsum wallboard and other gypsum products are manufactured is the hemihydrate form of calcium sulfate ($CaSO_4 \cdot \frac{1}{2}H_2O$), commonly termed "stucco," which is produced by heat conversion of the dihydrate form of calcium sulfate ($CaSO_4 \cdot 2H_2O$), from which 1½ water molecules been removed.

Conventional gypsum-containing products such as gypsum wallboard have many advantages, such as low cost and easy workability, although substantial amounts of gypsum dust can be generated when the products are cut or drilled. Various improvements have been achieved in making gypsum-containing products using starches as ingredients in the slurries used to make such products. Starch can increase flexural strength and compressive strength of gypsum-containing products including gypsum wallboard. Known gypsum wallboard contains board starch at levels of less than about 10 lbs/MSF.

It is also necessary to use substantial amounts of water in gypsum slurries containing pregelatinized starch in order to ensure proper flowability of the slurry. Unfortunately, most of this water must eventually be driven off by heating, which is expensive due to the high cost of the fuels used in the heating process. The heating step is also time-consuming. It has been found that the use of naphthalenesulfonate dispersants can increase the fluidity of the slurries, thus overcoming the water demand problem. In addition, it has also been found that the naphthalenesulfonate dispersants, if the usage level is high enough, can cross-link to the pregelatinized starch to bind the gypsum crystals after drying, thus increasing dry strength of the gypsum composite. Trimetaphosphate salts have not in the past been recognized to affect gypsum slurry water requirements. However, the present inventors have discovered that increasing the level of the trimetaphosphate salt to hitherto unknown levels in the presence of a specific dispersant makes it possible to achieve proper slurry flowability with unexpectedly reduced amounts of water, even in the presence of high starch levels. This, of course, is highly desirable because it in turn reduces fuel usage as well as the process time associated with subsequent water removal process steps. Thus the present inventors have also discovered that the dry strength of gypsum board can be increased by using a naphthalenesulfonate dispersant in combination with pregelatinized starch in the slurry used to make the wallboard.

BRIEF SUMMARY OF THE INVENTION

The invention generally comprises a slurry including stucco, naphthalenesulfonate dispersant, and pregelatinized starch. The naphthalenesulfonate dispersant is present in an amount of about 0.1%-3.0% by weight based on the weight of dry stucco. The pregelatinized starch is present in an amount of at least about 0.5% by weight up to about 10% by weight based on the weight of dry stucco in the formulation. Other slurry additives can include accelerators, binders, paper or glass fibers and other known constituents. The invention also comprises the gypsum-containing products made with such slurries.

The invention also comprises a slurry including stucco, trimetaphosphate salt, naphthalenesulfonate dispersant, and pregelatinized starch. The sodium trimetaphosphate is present in an amount of at least about 0.12% by weight based on the weight of stucco. In a preferred embodiment, the trimetaphosphate salt is present in an amount of about 0.12-0.4% by weight based on the weight of dry stucco. The naphthalenesulfonate dispersant is present in an amount of about 0.1%-3.0% by weight based on the weight of dry stucco. The pregelatinized starch is present in an amount of at least about 0.5% by weight up to about 10% by weight based on the weight of dry stucco in the formulation. Other slurry additives can include accelerators, binders, paper or glass fibers and other known constituents. The invention also comprises the gypsum-containing products made with such slurries.

A preferred gypsum-containing product is gypsum wallboard. In this embodiment, the invention constitutes gypsum wallboard comprising a set gypsum composition formed between two substantially parallel cover sheets, the set gypsum composition made using the gypsum-containing slurry of water, stucco, pregelatinized starch, and a naphthalenesulfonate dispersant. The gypsum-containing slurry can optionally contain a trimetaphosphate salt, for example, sodium trimetaphosphate. This gypsum wallboard made in accordance with the invention has a high strength, yet much lower weight than conventional boards. In addition, much less dust is generated on cutting, sawing, snapping, or drilling the wallboards made according to this embodiment.

In another embodiment the invention constitutes a method of making gypsum wallboard by mixing a gypsum-containing slurry comprising water, stucco, pregelatinized starch, and a naphthalenesulfonate dispersant, wherein the pregelatinized starch is present in an amount of at least about 0.5% by weight up to about 10% by weight based on the weight of stucco. The resulting gypsum-containing slurry is deposited on a first paper cover sheet, and a second paper cover sheet is placed over the deposited slurry to form a gypsum wallboard. The gypsum wallboard is cut after the gypsum-containing slurry has hardened sufficiently for cutting, and the resulting gypsum wallboard is dried. The gypsum-containing slurry can optionally contain a trimetaphosphate salt, for example, sodium trimetaphosphate. Other conventional ingredients will also be used in the slurry including, as appropriate, accelerators, binders, paper fiber, glass fiber, and other known ingredients. A soap foam is normally added to reduce the density of the final gypsum wallboard product.

DETAILED DESCRIPTION OF THE INVENTION

According to one embodiment of the present invention, there are provided finished gypsum-containing products made from gypsum-containing slurries containing stucco, pregelatinized starch, and a naphthalenesulfonate dispersant. The naphthalenesulfonate dispersant is present in an amount of about 0.1%-3.0% by weight based on the weight of dry stucco. The pregelatinized starch is present in an amount of at least about 0.5% by weight up to about 10% by weight based on the weight of dry stucco in the formulation. Other ingredients that may be used in the slurry include binders, paper fiber, glass fiber, and accelerators. A soap foam is normally added to the newly formulated gypsum-containing slurries to reduce the density of the final gypsum-containing product, for example, gypsum wallboard.

Optionally, the combination of from about 0.5% by weight up to about 10% by weight pregelatinized starch, from about 0.1% by weight up to about 3.0% by weight naphthalenesulfonate dispersant, and a minimum of at least about 0.12% by weight up to about 0.4% by weight of trimetaphosphate salt (all based on the weight of dry stucco used in the gypsum slurry) unexpectedly and significantly increases the fluidity of the gypsum slurry. This substantially reduces the amount of water required to produce a gypsum slurry with sufficient flowability to be used in making gypsum-containing products such as gypsum wallboard. The level of trimetaphosphate salt, which is at least about twice that of standard formulations (as sodium trimetaphosphate), is believed to boost the dispersant activity of the naphthalenesulfonate dispersant.

The naphthalenesulfonate dispersants used in the present invention include polynaphthalenesulfonic acid and its salts (polynaphthalenesulfonates) and derivatives, which are condensation products of naphthalenesulfonic acids and formaldehyde. Particularly desirable polynaphthalenesulfonates include sodium and calcium naphthalenesulfonate. The average molecular weight of the naphthalenesulfonates can range from about 3,000 to 27,000, although it is preferred that the molecular weight be about 8,000 to 10,000. At a given solid % aqueous solution, a higher molecular weight dispersant has higher viscosity, and generates a higher water demand in the formulation, than a lower molecular weight dispersant. Useful naphthalenesulfonates include DILOFLO, available from GEO Specialty Chemicals, Cleveland, Ohio; DAXAD, available from Hampshire Chemical Corp., Lexington, Mass.; and LOMAR D, available from GEO Specialty Chemicals, Lafayette, Ind. The naphthalenesulfonates are preferably used as aqueous solutions in the range 35-55% by weight solids content, for example. It is most preferred to use the naphthalenesulfonates in the form of an aqueous solution, for example, in the range of about 40-45% by weight solids content. Alternatively, where appropriate, the naphthalenesulfonates can be used in dry solid or powder form, such as LOMAR D, for example.

The polynaphthalenesulfonates useful in the present invention have the general structure (I):

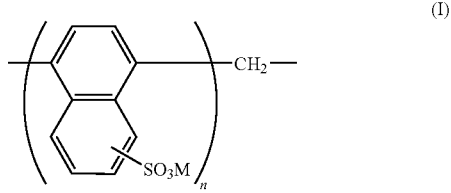

wherein n is >2, and wherein M is sodium, potassium, calcium, and the like.

The naphthalenesulfonate dispersant, preferably as an about 45% by weight solution in water, may be used in a range of from about 0.5% to about 3.0% by weight based on the weight of dry stucco used in the gypsum composite formulation. A more preferred range of naphthalenesulfonate dispersant is from about 0.5% to about 2.0% by weight based on the weight of dry stucco, and a most preferred range from about 0.7% to about 2.0% by weight based on the weight of dry stucco. In contrast, known gypsum wallboard contains this dispersant at levels of about 0.4% by weight, or less, based on the weight of dry stucco.

Stated in an another way, the naphthalenesulfonate dispersant, on a dry weight basis, may be used in a range from about 0.1% to about 1.5% by weight based of the weight of dry stucco used in the gypsum composite formulation. A more preferred range of naphthalenesulfonate dispersant, on a dry solids basis, is from about 0.25% to about 0.7% by weight based on the weight of dry stucco, and a most preferred range (on a dry solids basis) from about 0.3% to about 0.7% by weight based on the weight of dry stucco.

The gypsum-containing slurry can optionally contain a trimetaphosphate salt, for example, sodium trimetaphosphate. Any suitable water-soluble metaphosphate or polyphosphate can be used in accordance with the present invention. It is preferred that a trimetaphosphate salt be used, including double salts, that is trimetaphosphate salts having two cations. Particularly useful trimetaphosphate salts include sodium trimetaphosphate, potassium trimetaphosphate, calcium trimetaphosphate, sodium calcium trimetaphosphate, lithium trimetaphosphate, ammonium trimetaphosphate, and the like, or combinations thereof. A preferred trimetaphosphate salt is sodium trimetaphosphate. It is preferred to use the trimetaphosphate salt as an aqueous solution, for example, in the range of about 10-15% by weight solids content. Other cyclic or acyclic polyphosphates can also be used, as described in U.S. Pat. No. 6,409,825 to Yu et al., herein incorporated by reference.

Sodium trimetaphosphate is a known additive in gypsum-containing compositions, although it is generally used in a range of from about 0.05% to about 0.08% by weight based on the weight of dry stucco used in the gypsum slurry. In the embodiments of the present invention, sodium trimetaphosphate (or other water-soluble metaphosphate or polyphosphate) can be present in the range of from about 0.12% to about 0.4% by weight based on the weight of dry stucco used in the gypsum composite formulation. A preferred range of sodium trimetaphosphate (or other water-soluble metaphosphate or polyphosphate) is from about 0.12% to about 0.3% by weight based on the weight of dry stucco used in the gypsum composite formulation.

There are two forms of stucco, alpha and beta. These two types of stucco are produced by different means of calcination. In the present inventions either the beta or the alpha form of stucco may be used.

Starches, including pregelatinized starch in particular, must be used in gypsum-containing slurries prepared in accordance with the present invention. A preferred pregelatinized starch is pregelatinized corn starch, for example pregelatinized corn flour available from Bunge Milling, St. Louis, Mo., having the following typical analysis: moisture 7.5%, protein 8.0%, oil 0.5%, crude fiber 0.5%, ash 0.3%; having a green strength of 0.48 psi; and having a loose bulk density of 35.0 lb/ft$^3$. Pregelatinized corn starch should be used in an amount of at least about 0.5% by weight up to about 10% by weight, based on the weight of dry stucco used in the gypsum-containing slurry.

The present inventors have further discovered that an unexpected increase in dry strength (particularly in wallboard) can be obtained by using at least about 0.5% by weight up to about 10% by weight pregelatinized starch (preferably pregelatinized corn starch) in the presence of about 0.1% by weight to 3.0% by weight naphthalenesulfonate dispersant (starch and naphthalenesulfonate levels based on the weight of dry stucco present in the formulation). This unexpected result can be obtained whether or not water-soluble metaphosphate or polyphosphate is present.

In addition, it has unexpectedly been found that pregelatinized starch can be used at levels of at least about 10 lb/MSF, or more, in the dried gypsum wallboard made in accordance with the present invention, yet high strength and low weight can be achieved. Levels as high as 35-45 lb/MSF pregelatinized starch in the gypsum wallboard have been shown to be effective. As an example, Formulation B, as shown in Tables 1 and 2 below, includes 45 lb/MSF, yet produced a board weight of 1042 lb/MSF having excellent strength. In this example (Formulation B), a naphthalenesulfonate dispersant as a 45% by weight solution in water, was used at a level of 1.28% by weight.

Other useful starches include acid-modified starches, such as acid-modified corn flour, available as HI-BOND from Bunge Milling, St. Louis, Mo. This starch has the following typical analysis: moisture 10.0%, oil 1.4%, solubles 17.0%, alkaline fluidity 98.0%, loose bulk density 30 lb/ft$^3$, and a 20% slurry producing a pH of 4.3. Another useful starch is non-pregelatinized wheat starch, such as ECOSOL-45, available from ADM/Ogilvie, Montreal, Quebec, Canada.

A further unexpected result may be achieved with the present invention when the naphthalenesulfonate dispersant trimetaphosphate salt combination is combined with pregelatinized corn starch, and optionally, paper fiber or glass fiber. Gypsum wallboard made from formulations containing these three ingredients have increased strength and reduced weight, and are more economically desirable due to the reduced water requirements in their manufacture.

Accelerators can be used in the gypsum-containing compositions of the present invention, as described in U.S. Pat. No. 6,409,825 to Yu et al., herein incorporated by reference. One desirable heat resistant accelerator (HRA) can be made from the dry grinding of landplaster (calcium sulfate dihydrate). Small amounts of additives (normally about 5% by weight) such as sugar, dextrose, boric acid, and starch can be used to make this HRA. Sugar, or dextrose, is currently preferred. Another useful accelerator is "climate stabilized accelerator" or "climate stable accelerator," (CSA) as described in U.S. Pat. No. 3,573,947, herein incorporated by reference.

The following examples further illustrate the invention. They should not be construed as in any way limiting the scope of the invention.

Example 1

Sample Gypsum Slurry Formulations

Gypsum slurry formulations are shown in Table 1 below. All values in Table 1 are expressed as weight percent based on the weight of dry stucco. Values in parentheses are dry weight in pounds (lb/MSF).

TABLE 1

| Component | Formulation A | Formulation B |
|---|---|---|
| Stucco (lb/MSF) | (732) | (704) |
| sodium trimetaphosphate | 0.20 (1.50) | 0.30 (2.14) |
| Dispersant (naphthalenesulfonate) | 0.18 (1.35) | 0.58[1] (4.05) |
| Pregelatinized starch | 2.7 (20) | 6.4 (45) |
| Board starch | 0.41 (3.0) | 0 |
| Heat resistant accelerator (HRA) | (15) | (15) |
| Glass fiber | 0.27 (2.0) | 0.28 (2.0) |
| Paper fiber | 0 | 0.99 (7.0) |
| Soap* | 0.03 (0.192) | 0.03 (0.192) |

TABLE 1-continued

| Component | Formulation A | Formulation B |
|---|---|---|
| Total Water (lb.) | 805 | 852 |
| Water/Stucco ratio | 1.10 | 1.21 |

*Used to pregenerate foam.
[1]1.28% by weight as a 45% aqueous solution.

Example 2

Preparation of Wallboards

Sample gypsum wallboards were prepared in accordance with U.S. Pat. No. 6,342,284 to Yu et al. and U.S. Pat. No. 6,632,550 to Yu et al., herein incorporated by reference. This includes the separate generation of foam and introduction of the foam into the slurry of the other ingredients as described in Example 5 of these patents.

Test results for gypsum wallboards made using the Formulations A and B of Example 1, and a control are shown in Table 2 below. As in this example and other examples below, nail pull resistance, core hardness, and flexural strength tests were performed according to ASTM C-473. Additionally, it is noted that typical gypsum wallboard is approximately ½ inch thick and has a weight of between about 1600 to 1800 pounds per 1,000 square feet of material, or lb/MSF. ("MSF" is a standard abbreviation in the art for a thousand square feet; it is an area measurement for boxes, corrugated media and wallboard.)

TABLE 2

| Lab test result | Control Board | Formulation A Board | Formulation B Board |
|---|---|---|---|
| Board weight (lb/MSF) | 1587 | 1066 | 1042 |
| Nail pull resistance (lb) | 81.7 | 50.2 | 72.8 |
| Core hardness (lb) | 16.3 | 5.2 | 11.6 |
| Humidified bond load (lb) | 17.3 | 20.3 | 15.1 |
| Humidified bond failure (%) | 0.6 | 5 | 11.1 |
| Flexural strength, face-up (MD) (lb) | 47 | 47.2 | 52.6 |
| Flexural strength, face-down (MD) (lb) | 51.5 | 66.7 | 78.8 |
| Flexural strength, face-up (XMD) (lb) | 150 | 135.9 | 173.1 |
| Flexural strength, face-down (XMD) (lb) | 144.4 | 125.5 | 165.4 |

MD: machine direction
XMD: across machine direction

As illustrated in Table 2, gypsum wallboards prepared using the Formulation A and B slurries have significant reductions in weight compared to the control board. With reference again to Table 1, the comparisons of the Formulation A board to the Formulation B board are most striking. The water/stucco (w/s) ratios are similar in Formulation A and Formulation B. A significantly higher level of naphthalenesulfonate dispersant is also used in Formulation B. Also, in Formulation B substantially more pregelatinized starch was used, about 6% by weight, a greater than 100% increase over Formulation A accompanied by marked strength increases. Even so, the water demand to produce the required flowability remained low in the Formulation B slurry, the difference being about 10% in comparison to Formulation A. The low water demand in both Formulations is attributed to the synergistic effect of the combination of naphthalenesulfonate dispersant and sodium trimetaphosphate in the gypsum slurry, which increases the fluidity of the gypsum slurry, even in the presence of a substantially higher level of pregelatinized starch.

As illustrated in Table 2, the wallboard prepared using the Formulation B slurry has substantially increased strength compared with the wallboard prepared using the Formulation A slurry. By incorporating increased amounts of pregelatinized starch in combination with increased amounts of naphthalenesulfonate dispersant and sodium trimetaphosphate, nail pull resistance in the Formulation B board improved by 45% over the Formulation A board. Substantial increases in flexural strength were also observed in the Formulation B board as compared to the Formulation A board.

Example 3

½ Inch Gypsum Wallboard Weight Reduction Trials

Further gypsum wallboard examples (Boards C, D and E), including slurry formulations and test results are shown in Table 3 below. The slurry formulations of Table 3 include the major components of the slurries. Values in parentheses are expressed as weight percent based on the weight of dry stucco.

Gypsum Corp., Chicago, Ill. and tap water in the laboratory to determine their wet compressive strength. The following lab test procedure was used.

Stucco (1000 g), CSA (2 g), and tap water (1200 cc) at about 70° F. were used for each wet gypsum cube cast. Pregelatinized corn starch (20 g, 2.0% based on stucco wt.) and CSA (2 g, 0.2% based on stucco wt.) were thoroughly dry mixed first in a plastic bag with the stucco prior to mixing with a tap water solution containing both naphthalenesulfonate dispersant and sodium trimetaphosphate. The dispersant used was DILOFLO dispersant (1.0-2.0%, as indicated in Table 4). Varying amounts of sodium trimetaphosphate were used also as indicated in Table 4.

The dry ingredients and aqueous solution were initially combined in a laboratory Warning blender, the mixture produced allowed to soak for 10 sec, and then the mixture was mixed at low speed for 10 sec in order to make the slurry. The slurries thus formed were cast into three 2"×2"×2" cube molds. The cast cubes were then removed from the molds, weighed, and sealed inside plastic bags to prevent moisture loss before the compressive strength test was performed. The compressive strength of the wet cubes was measured using an

TABLE 3

|  | Control Board | Formulation C Board | Formulation D Board | Formulation E Board |
|---|---|---|---|---|
| Trial formulation component/parameter |  |  |  |  |
| Dry stucco (lb/MSF) | 1300 | 1281 | 1196 | 1070 |
| Accelerator (lb/MSF) | 9.2 | 9.2 | 9.2 | 9.2 |
| DILOFLO[1] (lb/MSF) | 4.1 (0.32%) | 8.1 (0.63%) | 8.1 (0.68%) | 8.1 (0.76%) |
| Regular starch (lb/MSF) | 5.6 (0.43%) | 0 | 0 | 0 |
| Pregelatinized corn starch (lb/MSF) | 0 | 10 (0.78%) | 10 (0.84%) | 10 (0.93%) |
| Sodium trimetaphosphate (lb/MSF) | 0.7 (0.05%) | 1.6 (0.12%) | 1.6 (0.13%) | 1.6 (0.15%) |
| Total water/stucco ratio (w/s) | 0.82 | 0.82 | 0.82 | 0.84 |
| Trial formulation test results |  |  |  |  |
| Dry board weight (lb/MSF) | 1611 | 1570 | 1451 | 1320 |
| Nail pull resistance (lb) | 77.3† | 85.5 | 77.2 | 65.2 |

† ASTM standard: 77 lb
[1]DILOFLO is a 45% Naphthalensulfonate solution in water As illustrated in Table 3, Boards C, D, and E were made from a slurry having substantially increased amounts of starch, DILOFLO dispersant, and sodium trimetaphosphate in comparison with the control board (about a two-fold increase on a percentage basis for the starch and dispersant, and a two- to three-fold increase for the trimetaphosphate), while maintaining the w/s ratio constant. Nevertheless, strength as measured by nail pull resistance was not dramatically affected and board weight was significantly reduced. Therefore, in this example of an embodiment of the invention, the new formulation (such as, for example, Board D) can provide increased starch formulated in a usable, flowable slurry, while maintaining adequate strength.

Example 4

Wet Gypsum Cube Strength Test

The wet cube strength tests were carried out by using Southard CKS board stucco, available from United States ATS machine and recorded as an average in pounds per square inch (psi). The results obtained were as follows:

TABLE 4

| Test Sample No. | Sodium trimetaphosphate, grams (wt % based on dry stucco) | DILOFLO[1] (wt % based on dry stucco) | Wet cube weight (2" × 2" × 2"), g | Wet cube compressive strength, psi |
|---|---|---|---|---|
| 1 | 0 | 1.5 | 183.57 | 321 |
| 2 | 0.5 (0.05) | 1.5 | 183.11 | 357 |
| 3 | 1 (0.1) | 1.5 | 183.19 | 360 |
| 4 | 2 (0.2) | 1.5 | 183.51 | 361 |
| 5 | 4 (0.4) | 1.5 | 183.65 | 381 |
| 6 | 10 (1.0) | 1.5 | 183.47 | 369 |
| 7 | 0 | 1.0 | 184.02 | 345 |
| 8 | 0.5 (0.05) | 1.0 | 183.66 | 349 |
| 9 | 1 (0.1) | 1.0 | 183.93 | 356 |
| 10 | 2 (0.2) | 1.0 | 182.67 | 366 |
| 11 | 4 (0.4) | 1.0 | 183.53 | 365 |

TABLE 4-continued

| Test Sample No. | Sodium trimetaphosphate, grams (wt % based on dry stucco) | DILOFLO[1] (wt % based on dry stucco) | Wet cube weight (2" × 2" × 2"), g | Wet cube compressive strength, psi |
|---|---|---|---|---|
| 12 | 10 (1.0) | 1.0 | 183.48 | 341 |
| 13 | 0 | 2.0 | 183.33 | 345 |
| 14 | 0.5 (0.05) | 2.0 | 184.06 | 356 |
| 15 | 1 (0.1) | 2.0 | 184.3 | 363 |
| 16 | 2 (0.2) | 2.0 | 184.02 | 363 |
| 17 | 4 (0.4) | 2.0 | 183.5 | 368 |
| 18 | 10 (1.0) | 2.0 | 182.68 | 339 |

[1]DILOFLO is a 45% Naphthalensulfonate solution in water

As illustrated in Table 4, Samples 4-5, 10-11, and 17, having levels of sodium trimetaphosphate in the about 0.12-0.4% range of the present invention generally provided superior wet cube compressive strength as compared to samples with sodium trimetaphosphate outside this range.

Example 5

½ Inch Light Weight Gypsum Wallboard Plant Production Trials

Further trials were performed (Trial Boards 1 and 2), including slurry formulations and test results are shown in Table 5 below. The slurry formulations of Table 5 include the major components of the slurries. Values in parentheses are expressed as weight percent based on the weight of dry stucco.

As illustrated in Table 5, Trial Boards 1 and 2 were made from a slurry having substantially increased amounts of starch, DILOFLO dispersant, and sodium trimetaphosphate, while slightly decreasing the w/s ratio, in comparison with the control boards. Nevertheless, strength as measured by nail pull resistance and flexural testing was maintained or improved, and board weight was significantly reduced. Therefore, in this example of an embodiment of the invention, the new formulation (such as, for example, Trial Boards 1 and 2) can provide increased trimetaphosphate and starch formulated in a usable, flowable slurry, while maintaining adequate strength.

Example 6

½ Inch Ultra-Light Weight Gypsum Wallboard Plant Production Trials

Further trials were performed (Trial Boards 3 and 4) using Formulation B (Example 1) as in Example 2, except that the pregelatinized corn starch was prepared with water at 10% concentration (wet starch preparation) and a blend of HYONIC PFM soaps (available from GEO Specialty Chemicals, Lafayette, Ind.) was used. For example, Trial Board 3 was prepared with a blend of HYONIC PFM 10/HYONIC PFM 33 ranging from 65-70% by weight/35-30% by weight. For example, Trial Board 4 was prepared with a 70/30 wt./wt. blend of HYONIC PFM 10/HYONIC PFM 33. The trial results are shown in Table 6 below.

TABLE 5

| Trial formulation component/parameter | Control Board 1 | Plant Formulation Trial Board 1 | Control Board 2 | Plant Formulation Trial Board 2 |
|---|---|---|---|---|
| Dry stucco (lb/MSF) | 1308 | 1160 | 1212 | 1120 |
| DILOFLO[1] (lb/MSF) | 5.98 (0.457%) | 7.98 (0.688%) | 7.18 (0.592%) | 8.99 (0.803%) |
| Regular starch (lb/MSF) | 5.0 (0.38%) | 0 | 4.6 (0.38%) | 0 |
| Pregelatinized corn starch (lb/MSF) | 2.0 (0.15%) | 10 (0.86%) | 2.5 (0.21%) | 9.0 (0.80%) |
| Sodium trimetaphosphate (lb/MSF) | 0.7 (0.05%) | 2.0 (0.17%) | 0.6 (0.05%) | 1.6 (0.14%) |
| Total water/stucco ratio (w/s) | 0.79 | 0.77 | 0.86 | 0.84 |
| Trial formulation test results | | | | |
| Dry board weight (lb/MSF) | 1619 | 1456 | 1553 | 1443 |
| Nail pull resistance (lb) | 81.2† | 82.4 | 80.7 | 80.4 |
| Flexural strength, average (MD) (lb) | 41.7 | 43.7 | 44.8 | 46.9 |
| Flexural strength, average (XMD) (lb) | 134.1 | 135.5 | 146 | 137.2 |
| Humidified bond[2] load, average (lb) | 19.2 | 17.7 | 20.9 | 19.1 |
| Humidified bond[2,3] failure (%) | 1.6 | 0.1 | 0.5 | 0 |

†ASTM standard: 77 lb
MD: machine direction
XMD: across machine direction
[1]DILOFLO is a 45% Naphthalensulfonate solution in water
[2]90° F./90% Relative Humidity
[3]It is well understood that under these test conditions, percentage failure rates <50% are acceptable.

TABLE 6

| Lab test result | Trial Board 3 (Formulation B plus HYONIC soap blend 65/35) (n = 12) | Trial Board 4 (Formulation B plus HYONIC soap blend 70/30) (n = 34)* |
|---|---|---|
| Board weight (lb/MSF) | 1106 | 1013 |
| Nail pull resistance$^a$ (lb) | 85.5 | 80.3 |
| Core hardness$^b$ (lb) | >15 | 12.4 |
| Flexural strength, average$^c$ (MD) (lb) | 55.6 | 60.3[1] |
| Flexural strength, average$^d$ (XMD) (lb) | 140.1 | 142.3[1] |

*Except as marked.
[1]n = 4
MD: machine direction
XMD: across machine direction
$^a$ASTM standard: 77 lb
$^b$ASTM standard: 11 lb
$^c$ASTM standard: 36 lb
$^d$ASTM standard: 107 lb As illustrated in Table 6, strength characteristics as measured by nail pull and core hardness were above the ASTM standard. Flexural strength was also measured to be above the ASTM standard. Again, in this example of an embodiment of the invention, the new formulation (such as, for example, Trial Boards 3 and 4) can provide increased trimetaphosphate and starch formulated in a usable, flowable slurry, while maintaining adequate strength.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A light weight high strength, low dusting gypsum wallboard comprising:
    a set gypsum composition formed between two substantially parallel cover sheets, the set gypsum composition made using a gypsum-containing slurry comprising:
    water, stucco, pregelatinized starch, and a naphthalenesulfonate dispersant, wherein the pregelatinized starch is present in an amount from about 0.5% by weight to about 10% by weight based on the weight of stucco.

2. The light weight gypsum wallboard of claim 1, wherein the naphthalenesulfonate dispersant is present in an amount from about 0.1% to about 3.0% by weight based on the weight of stucco.

3. The light weight gypsum wallboard of claim 1, wherein the naphthalenesulfonate dispersant is present in an amount from about 0.250% to about 2.0% by weight based on the weight of stucco.

4. The light weight gypsum wallboard of claim 1, wherein the naphthalenesulfonate dispersant is present in an amount from about 0.3% to about 0.7% by weight based on the weight of stucco.

5. The light weight gypsum wallboard of claim 1, wherein the naphthalenesulfonate dispersant is in the form of an aqueous solution containing about 40% to about 45% by weight naphthalenesulfonate and the aqueous solution is present in an amount from about 0.5% to about 2.5% by weight based on the weight of stucco.

6. The light weight gypsum wallboard of claim 1, wherein the naphthalenesulfonate dispersant is in the form of an aqueous solution containing about 40% to about 45% by weight naphthalenesulfonate and the aqueous solution is present in an amount from about 0.5% to about 2.0% by weight based on the weight of stucco.

7. The light weight gypsum wallboard of claim 1, wherein the naphthalenesulfonate dispersant is in the form of an aqueous solution containing about 40% to about 45% by weight naphthalenesulfonate and the aqueous solution is present in an amount from about 0.7% to about 1.5% by weight based on the weight of stucco.

8. The light weight gypsum wallboard of claim 1, further comprising sodium trimetaphosphate present in an amount from about 0.12% to about 0.4% based on the weight of stucco.

9. The light weight gypsum wallboard of claim 1, wherein the wallboard has a dry weight of about 1000 lb/MSF to about 1400 lb/MSF.

10. The light weight gypsum wallboard of claim 8, wherein the wallboard has a dry weight of about 1000 lb/MSF to about 1400 lb/MSF.

11. The light weight gypsum wallboard of claim 8, wherein the wallboard has a dry weight of about 500 lb/MSF to about 1000 lb/MSF.

12. A method of making high strength, low dusting gypsum wallboard, comprising the steps of:
    (a) mixing a gypsum-containing slurry comprising water, stucco, pregelatinized starch, and a naphthalenesulfonate dispersant, wherein the pregelatinized starch is present in an amount from about 0.5% by weight to about boo by weight based on the weight of stucco, and wherein the naphthalenesulfonate dispersant is present in an amount from about 0.1% to about 3.0% by weight based on the weight of stucco;
    (b) depositing the gypsum-containing slurry on a first cover sheet;
    (c) placing a second cover sheet over the deposited slurry to form a gypsum wallboard;
    (d) cutting the gypsum wallboard after the gypsum-containing slurry has hardened sufficiently for cutting; and
    (e) drying the gypsum wallboard.

13. The method of claim 12, in which the first cover sheet and the second cover sheet are made of paper.

14. The method of claim 12, wherein the slurry further comprises sodium trimetaphosphate present in an amount from about 0.12% to about 0.4% by weight based on the weight of stucco.

15. The light weight gypsum wallboard of claim 1 in which the pregelatinized starch is pregelatinized corn starch.

* * * * *

UNITED STATES PATENT AND TRADEMARK OFFICE
CERTIFICATE OF CORRECTION

| | | |
|---|---|---|
| PATENT NO. | : 7,731,794 B2 | Page 1 of 1 |
| APPLICATION NO. | : 11/449177 | |
| DATED | : June 8, 2010 | |
| INVENTOR(S) | : Yu et al. | |

It is certified that error appears in the above-identified patent and that said Letters Patent is hereby corrected as shown below:

In Claim 12, Column 12, line 46, replace "boo" with -- 10% --

Signed and Sealed this

Ninth Day of November, 2010

David J. Kappos
*Director of the United States Patent and Trademark Office*